United States Patent
Ishihara et al.

(10) Patent No.: US 9,233,556 B2
(45) Date of Patent: Jan. 12, 2016

(54) INK JET RECORDING APPARATUS AND INK JET RECORDING METHOD

(71) Applicant: Seiko Epson Corporation, Tokyo (JP)

(72) Inventors: Daisuke Ishihara, Matsumoto (JP); Yoichi Yamada, Shiojiri (JP); Masaru Kobashi, Matsumoto (JP)

(73) Assignee: Seiko Epson Corporation (JP)

( * ) Notice: Subject to any disclaimer, the term of this patent is extended or adjusted under 35 U.S.C. 154(b) by 295 days.

(21) Appl. No.: 13/851,492

(22) Filed: Mar. 27, 2013

(65) Prior Publication Data

US 2013/0278671 A1    Oct. 24, 2013

(30) Foreign Application Priority Data

Apr. 19, 2012 (JP) .................. 2012-095951

(51) Int. Cl.
  B41J 11/00 (2006.01)
  B41J 2/21 (2006.01)
  B41J 11/02 (2006.01)
  C09D 11/30 (2014.01)

(52) U.S. Cl.
  CPC ........... B41J 11/0005 (2013.01); B41J 2/2107 (2013.01); B41J 11/02 (2013.01); C09D 11/30 (2013.01)

(58) Field of Classification Search
  CPC ...... B41J 11/02; B41J 11/0005; B41J 2/2107; C09D 11/30
  USPC ............. 347/95–101, 104, 220; 400/662; 106/31.13, 31.27, 31.6
  See application file for complete search history.

(56) References Cited

U.S. PATENT DOCUMENTS

| 8,690,303 | B2 * | 4/2014 | Sakai et al. ............... 347/95 |
| 8,714,736 | B2 * | 5/2014 | Koike et al. .............. 347/104 |
| 2004/0240897 | A1 * | 12/2004 | Chou et al. ............... 399/29 |
| 2007/0091146 | A1 * | 4/2007 | Endo et al. ............... 347/55 |
| 2010/0112219 | A1 | 5/2010 | Yokohama et al. |
| 2010/0247874 | A1 | 9/2010 | Ishihara et al. |
| 2011/0115865 | A1 * | 5/2011 | Katsuki et al. ............ 347/104 |
| 2012/0256986 | A1 * | 10/2012 | Kobashi et al. ........... 347/47 |
| 2013/0027491 | A1 * | 1/2013 | Koike et al. .............. 347/104 |

FOREIGN PATENT DOCUMENTS

| JP | 2007-153947 | 6/2007 |
| JP | 2007-161851 | 6/2007 |
| JP | 2010-106141 | 5/2010 |
| JP | 2010-248477 | 11/2010 |

* cited by examiner

*Primary Examiner* — Matthew Luu
*Assistant Examiner* — Rut Patel
(74) *Attorney, Agent, or Firm* — Harness, Dickey & Pierce, P.L.C.

(57) ABSTRACT

An ink jet recording apparatus includes a printer head that ejects ink and a platen. The ink includes an organic solvent, a surfactant, and 60% by mass or less of water. The platen is composed of a material containing a conductive resin. A solubility parameter A $[(J/cm^3)^{1/2}]$ calculated from the organic solvent and the surfactant and a solubility parameter B $[(J/cm^3)^{1/2}]$ of the conductive resin satisfy $|A-B| \geq 2$.

12 Claims, 1 Drawing Sheet

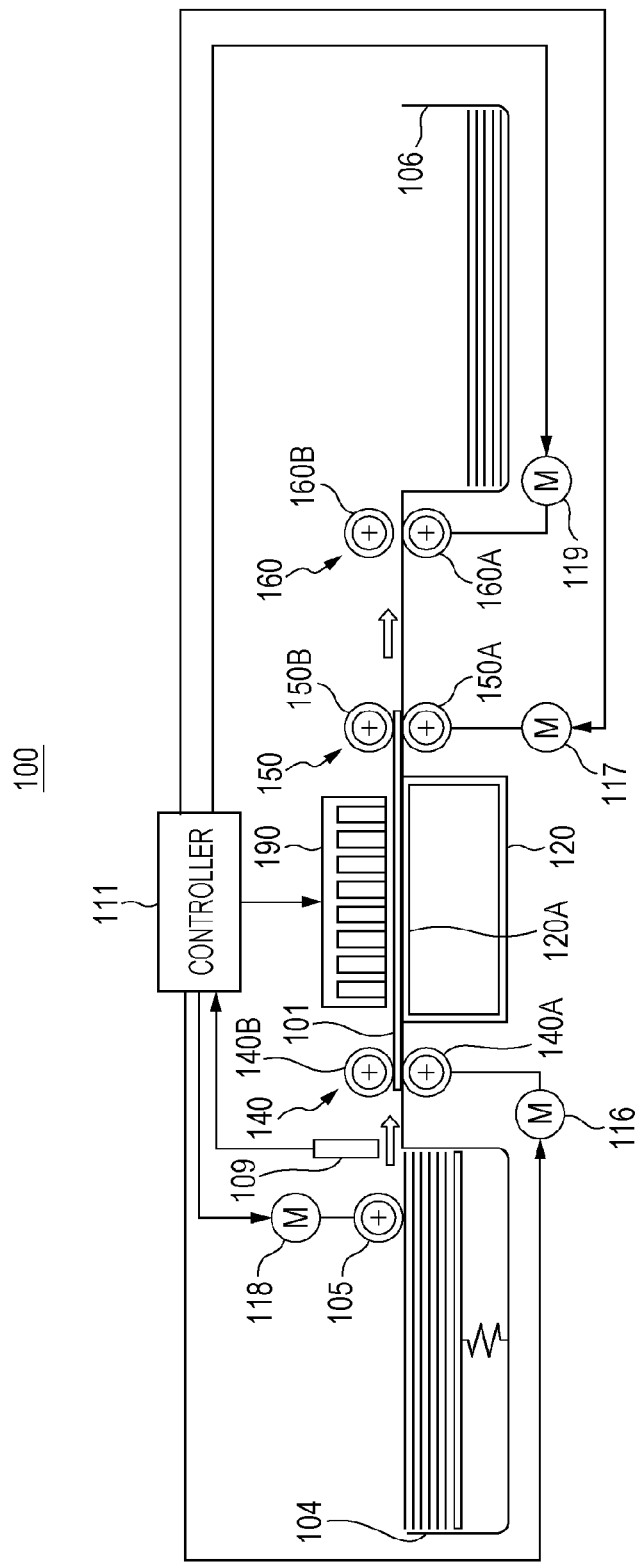

INK JET RECORDING APPARATUS AND INK JET RECORDING METHOD

The entire disclosure of Japanese Application No. 2012-095951 filed on Apr. 19, 2012 is expressly incorporated by reference herein.

BACKGROUND

1. Technical Field

The present invention relates to an ink jet recording apparatus and an ink jet recording method.

2. Related Art

There have been known an ink jet recording apparatus (recording method) that records an image by ejecting ink from an ink jet head onto a recording medium such as paper. There has been a problem in such an ink jet recording apparatus in that moisture in the ejected ink causes a recording medium having been subjected to printing to wrinkle and to curl. In order to address such a problem, attempts have been made to prevent a recording medium from wrinkling and curling by, for example, reducing the water content in the ink (e.g. see JP-A-2007-161851).

However, when the water content is reduced, the amount of an organic solvent needs to be increased accordingly. As a result, the adverse effect of the organic solvent on members inside the ink jet recording apparatus (particularly, platen) becomes considerable. There is also another problem in that the viscosity of ink increases when the water content is reduced, which accordingly increases the amount of ink mist produced when ink is ejected. When the amount of mist is large, ink easily adheres to the members inside the ink jet recording apparatus (particularly, platen), which results in problems such as contamination of a recording medium and malfunction of the ink jet recording apparatus.

SUMMARY

An advantage of some aspects of the invention is to provide an ink jet recording apparatus that allows suppression of the occurrence of curling of a recording medium, that allows suppression of adhesion of ink mist to a platen, and that reduces the adverse effect of ink mist on the platen, and an ink jet recording method in which the ink jet recording apparatus is employed.

In order to achieve the advantage, an ink jet recording apparatus according to a first aspect of the invention includes a printer head that ejects ink and a platen. The ink includes an organic solvent, a surfactant, and 60% by mass or less of water. The platen is composed of a material containing a conductive resin. A solubility parameter A $[(J/cm^3)^{1/2}]$ calculated from the organic solvent and the surfactant and a solubility parameter B $[(J/cm^3)^{1/2}]$ of the conductive resin satisfy $|A-B| \geq 2$. This provides the ink jet recording apparatus that allows suppression of the occurrence of curling of a recording medium, that allows suppression of adhesion of ink mist to the platen, and that reduces the adverse effect of ink mist on the platen.

In the above-described ink jet recording apparatus, the conductivity of the conductive resin is preferably $10^6$ Ω·cm or more and $10^{12}$ Ω·cm or less. This allows suppression of adhesion of ink mist to the platen more effectively. In the above-described ink jet recording apparatus, the solubility parameter of the conductive resin is preferably 16 $(J/cm^3)^{1/2}$ or more and 22 $(J/cm^3)^{1/2}$ or less. This reduces the adverse effect (attacking properties) of an organic solvent and a surfactant on the platen more effectively.

In the above-described ink jet recording apparatus, the viscosity of the ink is preferably 5 mPa·s or more and 10 mPa·s or less at 25° C. This allows suppression of adhesion of ink mist to the platen more effectively. In the above-described ink jet recording apparatus, the ink preferably includes, as a humectant, at least one selected from a group consisting of organic compounds having 3 or more hydroxyl groups and N,N,N-trialkyl amino acids. This allows, for example, suppression of clogging of the ink jet head in the vicinity of the nozzle thereof more effectively.

In the above-described ink jet recording apparatus, the content of the humectant is preferably 1% by mass or more and 40% by mass or less. This reduces the amount of ink mist generated more effectively. An ink jet recording method according to a second aspect of the invention employs the ink jet recording apparatus according to the first aspect of the invention. This provides the ink jet recording method that allows suppression of the occurrence of curling of a recording medium, that allows suppression of adhesion of ink mist to the platen, and that reduces the adverse effect of ink mist on the platen.

BRIEF DESCRIPTION OF THE DRAWING

The invention will be described with reference to the accompanying drawing, wherein like numbers reference like elements.

FIGURE is a diagram schematically showing an example of the ink jet recording apparatus.

DESCRIPTION OF EXEMPLARY EMBODIMENTS

Hereafter a preferred embodiment of the invention is described in detail.

Ink Jet Recording Apparatus (Ink Jet Recording Method)

The ink jet recording apparatus according to a preferred embodiment of the invention is described. FIGURE is a diagram schematically showing an example of the ink jet recording apparatus according to the embodiment. As shown in FIGURE, an ink jet recording apparatus 100 serves as a recording apparatus and includes a recording medium 101, an ink jet head unit 190 that ejects ink droplets to record an image, a platen 120 disposed so as to face the ink jet head unit 190, a storage cassette 104 that stores the recording medium 101 to be subjected to printing, a feed roller 105 that feeds the recording medium 101 from the storage cassette 104, a pair of transport rollers (gate rollers) 140 used for transporting the recording medium 101, a pair of first exit rollers 150 and a pair of second exit rollers 160 used for transporting and outputting the recording medium 101, an output tray 106 used for storing the recording medium 101 having been subjected to printing, a controller 111, and a position detecting sensor 109 that detects the position of the recording medium 101 that is fed.

The ink jet head unit 190 is a printing unit and includes a plurality of ink jet heads each corresponding to respective inks and a carriage (not shown) including the ink jet heads. Each of the ink jet heads is a so-called line head, which includes a number of ink ejection nozzles arranged in the width direction of the recording medium 101 so as to cover the overall width of the recording medium 101. The recording medium 101 is transported along a transport surface 120A of the platen 120.

Attempts have been made to prevent a recording medium from wrinkling and curling by reducing water content. However, when the water content is reduced, the amount of an organic solvent needs to be increased accordingly. As a result, the adverse effect of the organic solvent on members inside the ink jet recording apparatus (particularly, platen) becomes considerable. When the water content is reduced, there is another problem in that the viscosity of ink increases and the amount of ink mist produced when the ink is ejected increases accordingly. When the amount of mist is large, the ink easily adheres to the members inside the ink jet recording apparatus (particularly, platen), resulting in problems, such as contamination of a recording medium and malfunction of the ink jet recording apparatus.

The inventors have conducted extensive studies and consequently found that the above-described problems can be addressed by employing an ink jet recording apparatus (ink jet recording method) that includes a printer head that ejects ink and a platen, the ink including an organic solvent, a surfactant, and 60% by mass or less of water, the platen being composed of a material containing a conductive resin, wherein a solubility parameter A $[(J/cm^3)^{1/2}]$ calculated from the organic solvent and the surfactant and a solubility parameter B $[(J/cm^3)^{1/2}]$ of the conductive resin satisfy $|A-B|\geq 2$. Thus, the invention has been made.

The ink jet recording apparatus according to the first aspect of the invention allows suppression of the occurrence of curling of a recording medium, allows suppression of adhesion of ink mist to the platen, and reduces the adverse effect of ink mist on the platen even in the case where ink with a low water content is used. Specifically, the platen of the ink jet recording apparatus is composed of a conductive resin so as to make the platen electrically neutral, which allows suppression of the adhesion of the charged ink mist to the platen. In addition, a difference between the solubility parameter of the organic solvent and surfactant in the ink and the solubility parameter of the conductive resin is made, which reduces the adverse effect of the organic solvent and the surfactant on the platen (attacking properties).

Examples of the conductive resin contained in the material constituting the platen include resins obtained by adding a conductive substance having conductivity (e.g., carbon black, carbon fiber, or zinc oxide) to a resin such as polyacetal resin (POM), polyphenylene sulfide resin (PPS), polycarbonate resin (PC), acrylonitrile-butadiene-styrene resin (ABS), polystyrene resin (PS), or polypropylene resin (PP).

The conductivity of the conductive resin is preferably $10^6$ Ω·cm or more and $10^{12}$ Ω·cm or less. This allows suppression of adhesion of ink mist to the platen more effectively. The solubility parameter of the conductive resin is preferably 16 $(J/cm^3)^{1/2}$ or more and 22 $(J/cm^3)^{1/2}$ or less. This reduces the adverse effect (attacking properties) of the organic solvent and the surfactant on the platen more effectively.

The ink will be described in detail later. The transport surface 120A of the platen 120 is a flat surface perpendicular to the direction in which the ink jet head unit 190 ejects ink. Good images can be formed when the transport surface 120A is broad enough to maintain the recording medium 101 to be perpendicular to a direction in which ink droplets are ejected onto the recording medium 101.

The feed roller 105 feeds the recording medium 101 inside the storage cassette 104 toward the transport rollers 140 and is driven by a motor 118 controlled by the controller 111. The transport rollers 140 are a part of a transportation unit and composed of a driving roller 140A and a driven roller 140B. The driving roller 140A is a roller unit driven by a motor 116 controlled by the controller 111 and brought into contact with the driven roller 140B, thereby driving the driven roller 140B.

The first exit rollers 150 are a part of the transportation unit and composed of a driving roller 150A and a driven roller 150B. The driving roller 150A is a roller unit driven by a motor 117 controlled by the controller 111 and brought into contact with the driven roller 150B, thereby driving the driven roller 150B. The second exit rollers 160 are a part of the transportation unit and composed of a driving roller 160A and a driven roller 160B. The driving roller 160A is a roller unit driven by a motor 119 controlled by the controller 111 and brought into contact with the driven roller 160B, thereby driving the driven roller 160B.

The controller 111 includes a central processing unit (CPU) that executes printing (recording) and various operations, a random access memory (RAM) that stores printing data (recording data) received from a host computer or the like through an interface into a data storage area, or temporarily stores various data, a programmable read-only memory (PROM) that stores, for example, control programs for controlling respective units, an electrically erasable programmable read-only memory (EEPROM), and the like.

The position detecting sensor 109 is, for example, a reflection-type photosensor including an infrared-emitting diode serving as a light-emitting element and a phototransistor serving as a light-receiving element. The position detecting sensor 109 is disposed in a paper-transporting unit positioned between the feed roller 105 and the transport rollers 140. The position detecting sensor 109 detects the position of the front edge of the recording medium 101 that is transported (i.e., presence or absence of the recording medium 101) and sends a detection signal to the controller 111. The controller 111 performs a driving control of the transport rollers 140 in accordance with the detection signal indicating the position of the front edge of the recording medium 101.

The recording medium 101 reaches the transport rollers 140 rotated by the motor 116 driven by the driving signal sent from the controller 111. The front edge of the recording medium 101 is brought into contact with the transport rollers 140 and thereby be aligned and directed in an appropriate direction. The recording medium 101 is then fed onto the platen 120 by the driving roller 140A and the driven roller 140B that pinch the recording medium 101 therebetween. The recording medium 101, which is transported to a printing space positioned below the ink jet head unit 190 by the transport rollers 140, reaches the first exit rollers 150 while being pinched between the transport rollers 140. At this time, the motor 117 is driven in accordance with the driving signal sent from the controller 111 to rotate the driving roller 150A, which is in contact with the driven roller 150B and thereby driving the driven roller 150B. The recording medium 101 is fed by the driving roller 150A and the driven roller 150B that pinch the recording medium 101 therebetween. Thus, the recording medium 101 is transported while being pinched between the transport rollers 140 and between the first exit rollers 150. Meanwhile, ink is ejected from the nozzle of the ink jet head unit 190 onto the recording medium 101 to perform printing on the basis of printing data while tensions are applied to the recording medium 101 in the transport direction and the width direction of the recording medium 101.

Printing on the recording medium 101 is performed as follows. The controller 111 obtains printing data from a host computer via an interface and stores the printing data in the RAM. The printing data is subjected to a predetermined process by the CPU and a driving signal is sent to a head driver on the basis of the processed data. The driving signal is then sent to the ink jet head unit 190 via the head driver. Upon receiving the driving signal, an electrostatic actuator is driven and thereby ink is ejected onto the recording medium 101 from a nozzle corresponding to the electrostatic actuator. Thus, an image based on the printing data is printed (recorded).

The method for printing images on the recording medium 101 is not limited to such an electrostatic suction system with an electrostatic actuator. Specifically, the ink jet recording method according to the embodiment includes ejecting ink in the form of droplets from a microscopic nozzle and allowing the droplets to land and adhere to a recording medium. Specific examples are described below. The first example is an electrostatic suction system, in which a strong electric field is applied between a nozzle and an acceleration electrode disposed in front of the nozzle, ink is ejected from the nozzle successively in the form of droplets, and a printing information signal is sent to deflection electrodes while the droplets fly between the deflection electrodes to record an image. Alternatively, the ink droplets may be ejected corresponding to the printing information without being deflected.

The second example is a method in which ink droplets are forced to be ejected by compressing a liquid ink with a small pump and mechanically vibrating a nozzle using a quartz oscillator or the like. The ejected droplets are charged at the same time of being ejected. A printing information signal is sent to deflection electrodes while the droplets fly between the deflection electrodes, thereby recording an image. The third example is a method using a piezoelectric element, in which a pressure and printing information is given to a liquid ink by a piezoelectric element at once and ink droplets are ejected to record an image.

The fourth example is a method in which the volume of liquid ink is rapidly increased by applying heat energy and ink is heated to foam by a microscopic electrode on the basis of a printing information signal, thus being ejected to record an image in the form of droplets. Any of the above-described methods can be employed in the ink jet recording apparatus (ink jet recording method) according to the embodiment.

The recording medium 101 having been subjected to printing is transported by the transport rollers 140 and the first exit rollers 150. After passing through the first exit rollers 150, the recording medium 101 having been subjected to printing is transported by only the second exit rollers 160 and stored in the output tray 106. In the above-described ink jet recording apparatus 100, only the platen 120 is composed of a material including a conductive resin. However, for example, some or all of the ink jet head, the transport rollers 140, the first exit rollers 150, and the like may also be composed of a material including a conductive resin. This allows suppression of the occurrence of malfunction of the ink jet recording apparatus 100 due to ink mist more effectively.

Ink

The ink used in the embodiment is described below. The ink used in the embodiment includes an organic solvent, a surfactant, and 60% by mass or less of water. In the ink used in the embodiment, a solubility parameter A $[(J/cm^3)^{1/2}]$ calculated from the organic solvent and the surfactant and a solubility parameter B $[(J/cm^3)^{1/2}]$ of the conductive resin satisfy $|A-B| \geq 2$. When such a relationship is satisfied, the adverse effect (attacking properties) of the organic solvent and the surfactant on the platen can be reduced. More preferably, $|A-B| \geq 5$ is satisfied. This significantly reduces the adverse effect.

The viscosity of the ink used in the embodiment at 25° C. is preferably 5 mPa·s or more and 10 mPa·s or less. This allows suppression of adhesion of ink mist to the platen more effectively. Note that, solubility parameter (SP) in the specification is defined as a value calculated on the basis of evaporation energy and molar volume of atoms and atomic groups proposed by Hansen (refer to Hansen Solubility Parameters: A User's Handbook).

"SP calculated from organic solvent and surfactant" denotes a value calculated as follows. For each organic solvent and surfactant in ink, a SP, which is a unique value, is determined. The obtained SPs are each multiplied by a mass ratio of the organic solvent or surfactant to the total mass of the organic solvents and surfactants. All the products are summed up to obtain "SP calculated from organic solvent and surfactant".

Each constituent is described below.

Organic Solvent

The organic solvent serves to suppress clogging of the ink jet head in the vicinity of the nozzle thereof, appropriately control the ink permeability of a recording medium and bleeding, and impart a drying property to ink. The SP of the organic solvent is preferably 30 or less.

Examples of the organic solvent include 1,2-alkanediols such as 1,2-octanediol, 1,2-hexanediol, 1,2-pentanediol, and 4-methyl-1,2-pentanediol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, triethylene glycol mono-n-butyl ether, 1-methyl-1-methoxy butanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; 2-pyrrolidone; and N-methyl-2-pyrrolidone. These solvents can be used alone or in combination. The content of the organic solvent in the ink is preferably 1% by mass or more and 20% by mass or less from the viewpoint of appropriate physical properties of the ink (e.g., viscosity), printing quality, and reliability.

Surfactant

The surfactant controls the wettability of a recording medium to ink and improves the permeability of a recording medium and the printing stability of the ink jet recording apparatus. Preferred examples of the surfactant include acetylene glycol surfactants and polyether-modified siloxanes. Examples of the acetylene glycol surfactants include Surfynol 420, 440, 465, 485, 104, and STG (product name, produced by Air Products and Chemicals, Inc.); OLFINE PD-001, SPC, E1004, and E1010 (product name, produced by Nissin Chemical Industry Co., Ltd.); and Acetylenol E00, E40, E100, and LH (product name, produced by Kawaken Fine Chemicals Co., Ltd.). Examples of the polyether-modified siloxanes include BYK-346, 347, 348, and UV3530 (produced by BYK Japan KK). These surfactants are used alone or in combination in the ink. Preferably, the surfactant is contained so that the surface tension of the ink is adjusted to 20 mN/m to 40 mN/m. More preferably, the content of the surfactant in the ink is 0.1% by mass or more and 3.0% by mass or less.

Water

The ink according to the embodiment contains 60% by mass or less of water. This effectively suppresses the occurrence of wrinkling and curling of a recording medium having been subjected to printing. The water content is 60% by mass or less, and more preferably 40% by mass or more and 60% by mass or less. This improves the fixability of the ink to a recording medium.

Other Constituents

Humectant

The ink may contain a humectant. This allows, for example, suppression of clogging of the ink jet head in the vicinity of the nozzle thereof more effectively. The humectant is preferably an organic compound having a SP greater than 30.

The ink preferably includes, as a humectant, at least one selected from a group consisting of organic compounds having 3 or more hydroxyl groups and N,N,N-trialkyl amino acids. These constituents have good hygroscopicity and thus have a beneficial effect as a humectant. Examples of the organic compounds having 3 or more hydroxyl groups include alcohols having 3 or more hydroxyl groups such as glycerin and trimethylolpropane, and saccharides such as glucose, mannose, fructose, ribose, xylose, arabinose, galactose, and sorbitol. These compounds can be used alone or in combination.

Examples of the N,N,N-trialkyl amino acids include glycine betaine, γ-butyrobetaine, homarine, trigonelline, carnitine, homoserine betaine, valine betaine, lysine betaine, ornithine betaine, alanine betaine, stachydrine, and glutamate betaine, which can be used alone or in combination. The content of the humectant is preferably 1% by mass or more and 40% by mass or less and more preferably 5% by mass or more and 20% by mass or less relative to the total mass of the ink. When the content of the humectant falls within the above range, clogging caused by the ink and the occurrence of curling can be suppressed more effectively.

Zwitterionic Compound

The ink may contain a zwitterionic compound. This suppresses the occurrence of wrinkling and curling of a recording medium having been subjected to printing more effectively. Examples of the zwitterionic compound include, but are not limited to, betaine compounds, amino acids, and derivatives thereof. Specifically, examples of the betaine compounds include N-trialkyl-substituted products of amino acids such as glycine betaine (117, also referred to as "trimethylglycine"), γ-butyrobetaine (145), homarine (137), trigonelline (137), carnitine (161), homoserine betaine (161), valine betaine (159), lysine betaine (188), ornithine betaine (176), alanine betaine (117), stachydrine (185), and glutamate betaine (189), where each number in parenthesis is the molecular weight. Examples of the amino acids include glycine (75), alanine (89), serine (105), threonine (119), valine (117), methionine (149), cysteine (121), proline (115), lysine (146), histidine (155), arginine (174), and derivatives of these amino acids, where each number in parenthesis is the molecular weight. Preferred are betaine compounds, and more preferred are trimethylglycine, which reduce the expansion rate of a recording medium having been subjected to printing with more certainty and suppresses clogging of the ink ejection nozzle. The zwitterionic compounds may be used alone or in combination. The zwitterionic compounds may be synthesized by a known method or obtained commercially. An example of a commercially available trimethylglycine is AMINOCOAT (produced by Asahi Kasei Chemicals Corporation).

The molecular weight of the zwitterionic compound is preferably 100 or more and 250 or less. If the molecular weight is less than 100, the variation in viscosity at 10° C. or more and 40° C. or less tends to increase and a recording medium tends to easily deform to curl as the recording medium becomes dried after the recording medium is subjected to printing. If the molecular weight exceeds 250, the viscosity of the ink tends to increase in accordance with the amount of the zwitterionic compound added to the ink. In addition, when the recording medium having been subjected to printing deforms, for example, when the recording medium curls, the deformation tends to be less easily to be removed even after the recording medium is completely dried.

The amount of the zwitterionic compound in the ink is preferably 10% by mass or more and 40% by mass or less and more preferably 10% by mass or more and 25% by mass or less relative to the total amount of the ink, which reduce the expansion rate of a recording medium having been subjected to printing and suppress clogging of the ink ejection nozzle of the ink jet head. If the amount of the zwitterionic compound is less than 10% by mass, it is difficult to reduce the expansion rate. If the amount of the zwitterionic compound exceeds 40% by mass, it is difficult to suppress the clogging.

Colorant

The colorant used in the embodiment may be a known dye or pigment described in, for example, "Senryo Binran" ([Dye Manual], published by Maruzen Co., Ltd.). The dye is not particularly limited and may be an acid dye, a direct dye, a reactive dye, or a basic dye. Examples of the dye include C.I. Acid Yellow 17, 23, 42, 44, 79, and 142; C.I. Acid Red 52, 80, 82, 249, 254, and 289; C.I. Acid Blue 9, 45, and 249; C.I. Acid Black 1, 2, 24, and 94; C.I. Food Black 1 and 2; C.I. Direct Yellow 1, 12, 24, 33, 50, 55, 58, 86, 132, 142, 144, and 173; C.I. Direct Red 1, 4, 9, 80, 81, 225, and 227; C.I. Direct Blue 1, 2, 15, 71, 86, 87, 98, 165, 199, and 202; C.I. Direct Black 19, 38, 51, 71, 154, 168, 171, and 195; C.I. Reactive Red 14, 32, 55, 79, and 249; and C.I. Reactive Black 3, 4, and 35.

A pigment is more preferable as the colorant than a dye because it has a higher weather resistance, such as water resistance, than a dye. In particular, when used with a recording media that easily absorbs ink, such as a plain paper sheet, a pigment is advantageous in that a pigment tends to stay on the surface of the recording medium, which is less likely to cause strike-through and produces good coloring, while the dye tends to be absorbed together with the ink. The pigment used for the ink according to the embodiment may be either a known inorganic pigment or organic pigment. Examples of such a pigment include pigments described in Color Index, such as Pigment Yellow, Pigment Red, Pigment Violet, Pigment Blue, and Pigment Black; phthalocyanine pigments, azo pigments, anthraquinone pigments, azomethine pigments, and pigments with condensed rings; organic pigments such as Yellow Nos. 4, 5, 205, and 401, Orange Nos. 228 and 405, Blue Nos. 1 and 404; and inorganic pigments such as carbon black, titanium oxide, zinc oxide, zirconium oxide, iron oxide, ultramarine blue, Prussian blue, and chrome oxide.

Examples of the pigment include, in Color Index, C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180; C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245; C.I. Pigment Violet 19, 23, 32, 33, 36, 38, 43, and 50; C.I. Pigment Blue 1, 2, 3, 15, 15:1, 15:2, 15:3, 15:4, 15:6, 15:34, 16, 18, 22, 25, 60, 65, and 66; C.I. Vat Blue 4 and 60; C.I. Pigment Green 7 and 10; C.I. Pigment Brown 3, 5, 25, and 26; C.I. Pigment Orange 2, 5, 7, 13, 14, 15, 16, 24, 34, 36, 38, 40, 43, and 63; and C.I. Pigment Black 1 and 7. These pigments may be added to the ink alone or in combination.

The pigment according to the embodiment may be in the form of a resin dispersion. Such a pigment is preferably blended in the ink in the form of a pigment dispersion formed by dispersing the pigment in an aqueous medium using a ball mill, a roll mill, a bead mill, a high pressure homogenizer, a high-speed stirrer-type disperser, or the like, together with a dispersant such as macromolecular dispersant or surfactant. Alternatively, such a pigment is preferably blended in the ink in the form of a pigment dispersion formed by attaching a dispersibility-imparting group (hydrophilic functional group and/or its salt) to the surface of the pigment directly or via alkyl group, alkyl ether group, aryl group, or the like to modify the pigment so as to be a self-dispersible pigment that disperses and/or dissolves in an aqueous medium without a dispersant and by dispersing the pigment in an aqueous medium.

Examples of the macromolecular dispersant serving as the dispersant include natural macromolecular compounds such as glue, gelatin, and saponin, and synthesized macromolecular compounds such as polyvinyl alcohols, polypyrrolidones, acrylic resins (e.g., polyacrylic acid, acrylic acid-acrylonitrile copolymer, vinyl acetate-acrylic acid copolymer, and vinyl acetate-acrylic ester copolymer), styrene-acrylic acid-based resins (e.g., styrene-acrylic acid copolymer, styrene-methacrylic acid copolymer, styrene-methacrylic acid-acrylic acid alkylester copolymer, styrene-$\alpha$-methylstyrene-acrylic acid copolymer, styrene-$\alpha$-methylstyrene-acrylic acid-acrylic acid alkylester copolymer, and styrene-vinyl acetate-acrylic acid copolymer), styrene-maleic acid-based resins, vinyl acetate-vinyl fatty acid esters-ethylene copolymer-based resins, and salts of these compounds. The copolymer may be a random copolymer, a block copolymer, or a graft copolymer.

Examples of the surfactant used as a dispersant include anionic surfactants such as fatty acid salts, higher alkyl dicarboxylic acid salts, higher alcohol sulfuric ester salts, and higher alkylsulfonate salts; cationic surfactants such as fatty acid amine salts and fatty acid ammonium salts; and nonionic surfactants such as polyoxy alkyl ethers, polyoxy alkyl esters, and sorbitan alkyl esters.

The water-insoluble resin is particularly preferable among these dispersants. Specifically, the water-insoluble resin is preferably a block copolymer resin of a monomer having a hydrophobic group and a monomer having a hydrophilic group, at least includes a monomer having a salt-producing group, and has a solubility of less than 1 g relative to 100 g of water at 25° C. after neutralization. Examples of the monomer having the hydrophobic group include methacrylic acid esters such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl esters such as vinyl acetate; vinyl cyanides such as acrylonitrile and methacrylonitrile; and aromatic vinyl monomers such as styrene, $\alpha$-methyl styrene, vinyl toluene, 4-t-butyl-styrene, chlorostyrene, vinylanisole, and vinylnaphthalene. These monomers can be used alone or in mixture. Examples of the monomer having the hydrophilic group include polyethylene glycol monomethacrylate, polypropylene glycol monomethacrylate, and ethylene glycol-propylene glycol monomethacrylate. These monomers can be used alone or in mixture. Examples of the monomer having the salt-producing group include acrylic acid, methacrylic acid, styrene carboxylic acid, and maleic acid. These monomers can be used alone or in mixture. Optionally, in addition, macromonomers having a polymerizable functional group at one end such as styrene-based macromonomers and silicone-based macromonomers and other monomers can be used.

The water-insoluble resin is preferably used in the form of a salt obtained by neutralizing the water-insoluble resin with an alkali neutralizer such as ethylamine, tertiary amines including trimethylamine, lithium hydroxide, sodium hydroxide, potassium hydroxide, or ammonia. The weight-average molecular weight of the water-insoluble resin is preferably about 10,000 or more and about 150,000 or less, which allows the pigment to be dispersed stably.

The self-dispersible pigment, which disperses and/or dissolves in water without a dispersant, is produced, for example, by processing the pigment physically or chemically so that dispersibility-imparting groups or active species having the dispersibility-imparting groups are attached (grafted) to the surfaces of the particles of the pigment. An example of the physical processing is a vacuum plasma processing. Examples of the chemical processing include a wet oxidation method in which the surface of the particles of the pigment is oxidized with an oxidizer in water, and a method in which carboxyl groups are attached to the surface of the particles of the pigment via phenyl groups by attaching p-aminobenzoic acid to the surface of the particles of the pigment. The ink containing the self-dispersible pigment need not contain the above-described dispersant that is generally contained to disperse a pigment. Therefore, foaming resulting from degradation of antifoaming property due to the use of a dispersant hardly occurs, which permits an ink having good ejection stability to be prepared. In addition, the viscosity of the ink is prevented from markedly increasing due to the use of a dispersant. Therefore, the ink can contain more amount of pigment, which enhances the printing density and ease of use.

The volume-average particle diameter of the pigment in the ink is preferably 50 nm or more and 200 nm or less from the viewpoint of, for example, ink preservation stability and prevention of nozzle clogging. The volume-average particle diameter can be measured with a particle size analyzer such as Microtrac UPA150 (produced by Microtrac, Inc.) or a laser particle analyzer LPA3100 (produced by Otsuka Electronics Co., Ltd.).

The content of the pigment in the ink is preferably 6% by mass or more. If the content is less than 6% by mass, there are cases where unsatisfactory printing density (coloring property) is obtained. The upper limit of the content is not particularly limited and may be, for example, 25% by mass or less. The content exceeding 25% by mass may cause defects on reliability, such as clogging of the nozzle and unstable ejection.

Others

Optionally, the ink may contain a resin, a pH adjuster, a complexing agent, an antifoaming agent, an antioxidant, a UV absorber, a preservative and fungicide, and the like. Examples of the pH adjuster include alkali hydroxides such as lithium hydroxide, potassium hydroxide, and sodium hydroxide, and alkanolamines such as ammonia, triethanolamine, tripropanolamine, diethanolamine, and monoethanolamine. These pH adjusters can be used alone or in combination. In particular, the ink preferably contains at least one pH adjuster selected from alkali metal hydroxides, ammonia, triethanolamine, and tripropanolamine, so as to be adjusted to a pH of 6 to 10. An ink having a pH falling outside this range adversely affects the members and the like constituting the ink jet recording apparatus, which is likely to result in degradation of clogging recoverability. Examples of the complexing agent include aminopolycarboxylic acids such as ethylenediaminetetraacetic acid and its acids including sodium salts and ammonium salts.

A preferred embodiment of the invention is described above, which does not limit the scope of the invention. For example, although the above-described embodiment relates to a line-head ink jet recording apparatus, the ink jet recording method and the ink jet recording apparatus according to an aspect of the invention may be applied to a serial ink jet recording apparatus, which uses a plurality of passes for printing.

EXAMPLES

Specific examples of the invention are described below.
1. Preparation of Pigment Dispersion
Pigment Dispersion B1

Color Black 5170 (100 g, product name, produced by Degussa-Huls), which is a commercially available carbon black, was mixed in 1 kg of water and pulverized with a ball mill using zirconia beads. To this pulverized raw liquid, 1,400 g of sodium hypochlorite (available chlorine concentration: 12%) was added dropwise. The mixture was left to react for 5 hours while being pulverized with the ball mill, and subjected to wet oxidation by further being boiled for 4 hours under stirring. The resulting dispersion raw liquid was filtered with a glass fiber filter, GA-100 (product name, produced by Advantec Toyo Kaisha, Ltd.) and washed with water. The resulting wet cake was again dispersed in 5 kg of water and demineralized and refined using a reverse osmosis membrane until the conductivity reached 2 mS/cm. The refined dispersion was then condensed to a pigment concentration of 15% by weight to prepare pigment dispersion B1. The volumetric average particle diameter of the pigment in the dispersion was 110 nm according to the particle-size distribution measurement by Microtrac UPA150 (produced by Microtrac, Inc.).

Pigment Dispersion C1

Into a reaction vessel that had been sufficiently purged with nitrogen, 20 parts by weight of an organic solvent (methyl ethyl ketone), 0.03 parts by weight of a polymerization chain-transfer agent (2-mercaptoethanol), a polymerization initiator, and monomers shown in Table 1 were placed and polymerized under stirring at 75° C. Then, 0.9 parts by weight of 2,2'-azobis(2,4-dimethyl)valeronitrile that had been dissolved in 40 parts by weight of methyl ethyl ketone was added to the mixture relative to 100 parts by weight of the monomers. The mixture was aged at 80° C. for 1 hour to form a polymer solution.

TABLE 1

| Constituent monomers | Mass % |
|---|---|
| Methacrylic acid | 15 |
| Styrene monomer | 30 |
| Benzyl methacrylate | 20 |
| Polyethylene glycol monomethacrylate (15 mole EO adduct) | 10 |
| Polypropylene glycol monomethacrylate (9 mole PO adduct) | 10 |
| Styrene macromonomer | 15 |

The polymer solution was dried under reduced pressure, and 5 parts of the resulting product was dissolved in 15 parts of methyl ethyl ketone and neutralized with an aqueous sodium hydroxide solution. Then, 15 parts of C.I. Pigment Blue 15:4 was added to the polymer solution and kneaded with water using a dispersing machine. To the kneaded product, 100 parts of an ion exchanged water was added under stirring. Then, under reduced pressure at 60° C., methyl ethyl ketone was removed from the mixture, and subsequently some water was removed from the mixture to prepare pigment dispersion C1 having a solid content of 20% by weight. The volumetric average particle diameter of the pigment in the dispersion was 100 nm according to the particle-size distribution measurement by Microtrac UPA150 (produced by Microtrac, Inc.).

2. Preparation of Ink

Each constituent was mixed together in the proportion shown in Table 2 at room temperature for 2 hours, and subsequently filtered through a membrane filter with a pore size of 5 μm to prepare Inks 1 to 8. In Table 2, all values of respective constituents are their proportions in % by mass. Table 2 shows the composition of each ink, SP calculated from an organic solvent and a surfactant, and a viscosity of the ink at 25° C.

TABLE 2

| | | SP | Ink 1 | Ink 2 | Ink 3 | Ink 4 | Ink 5 | Ink 6 | Ink 7 | Ink 8 |
|---|---|---|---|---|---|---|---|---|---|---|
| Colorant | C.I. Direct Blue 199 (dye) | | 5 | — | — | — | — | — | — | — |
| | Pigment Dispersion B1 (in terms of pigment concentration) | | — | 10 | 10 | 10 | 10 | — | 10 | 10 |
| | Pigment Dispersion C1 (in terms of pigment concentration) | | — | — | — | — | — | 10 | — | — |
| Humectant | Glycerin | | 14 | 19 | 19 | 14 | 14 | 14 | 19 | 4 |
| | Trimethylolpropane | | — | 5 | 5 | — | 5 | 5 | 5 | 5 |
| | AMINOCOAT | | 0 | 0 | 0 | 11 | 10 | 10 | 15 | 10 |
| Organic solvent | Triethylene glycol monobutyl ether | 20.5 | 10 | 5 | — | 2 | — | — | — | — |
| | 1,2-Hexanediol | 26.0 | 10 | — | 5 | 2 | — | — | — | — |
| | 2-Pyrrolidinone | 29.1 | 5 | 5 | 5 | 5 | 5 | 5 | 5 | 5 |
| Surfactant | OLFINE E1010 | 25.8 | 0.5 | 0.5 | 0.5 | 0.5 | 0.5 | 0.5 | 0.5 | 0.5 |
| | Surfynol 104PG50 | 20.7 | 0.5 | 0.5 | 0.5 | 0.5 | 0.5 | 0.5 | 0.5 | 0.5 |
| | Water | 48.0 | 55 | 55 | 55 | 55 | 55 | 55 | 45 | 65 |
| | Solubility parameter A $[(J/cm^3)^{1/2}]$ calculated from organic solvent and surfactant | | 23.5 | 22.6 | 25.1 | 23.9 | 24.3 | 24.3 | 24.3 | 24.3 |
| | Viscosity at 25° C. [mPa·s] | | 8.2 | 8.8 | 8.8 | 7.8 | 8.0 | 8.2 | 8.5 | 4.5 |

3. Evaluation

Examples 1 to 6 and Comparative Examples 1 to 7

Using the ink shown in Table 3 and the ink jet recording apparatus 100 shown in FIGURE having a platen composed of the resin shown in Table 3, 10,000 sheets of solid images were printed out at a duty of 100% on recording media, which were plain paper sheets (Xerox 4200, produced by Xerox Corporation). In Table 3, "Conductive PP" refers to conductive polypropylene resin (produced by Daicel Polymer Ltd.), "Conductive ABS" refers to conductive acrylonitrile-butadiene-styrene resin (produced by Daicel Polymer Ltd.), and "ABS" refers to nonconductive acrylonitrile-butadiene-styrene resin (produced by Daicel Polymer Ltd.).

3.1 Mist Adhesion Evaluation

The platen was visually inspected whether or not the adherence of ink is present. "Good" was given when the adhesion of mist was absent or acceptable. "Poor" was given when the adhesion of the mist was severe.

3.2 Attacking Properties Evaluation

The above-mentioned platen was immersed in the ink and left at 70° C. for 10 days. Subsequently, the platen was visually inspected for defects such as melting, swelling, cracking, and surface roughness and evaluated in accordance with the following criteria.

Good: None of melting, swelling, cracking, and surface roughness was present

Poor: Any of melting, swelling, cracking, and surface roughness was present 3.3 Permanent Curl Test A printed sheet obtained as described above was left for 24 hours, then visually inspected, and evaluated in accordance with the following criteria. Table 3 shows the results.

Good: The amount of curling after being left for 24 hours was less than 20 mm

Poor: The amount of curling after being left for 24 hours was 20 mm or more the resin includes one of a polyacetal resin, a polyphenylene sulfide resin, a polycarbonate resin, an acrylonitrile-butadiene-styrene resin, a polystyrene resin, and a polypropylene resin, and a solubility parameter A $[(J/cm^3)^{1/2}]$ calculated from the organic solvent and the surfactant is different from a solubility parameter B $[(J/cm^3)^{1/2}]$ of the conductive resin, and the solubility parameters A and B satisfy $|A-B| \geq 2$.

2. The ink jet recording apparatus according to claim 1, wherein a conductivity of the conductive resin is $10^6$ Ω·cm or more and $10^{12}$ Ω·cm or less.

3. The ink jet recording apparatus according to claim 1, wherein a solubility parameter of the conductive resin is 16 $(J/cm^3)^{1/2}$ or more and 22 $(J/cm^3)^{1/2}$ or less.

4. The ink jet recording apparatus according to claim 1, wherein a viscosity of the ink is 5 mPa·s or more and 10 mPa·s or less at 25° C.

5. The ink jet recording apparatus according to claim 1, wherein the ink includes, as a humectant, at least one selected from the group consisting of organic compounds having 3 or more hydroxyl groups and N,N,N-trialkyl amino acids.

6. The ink jet recording apparatus according to claim 5, wherein a content of the humectant is 1% by mass or more and 40% by mass or less.

7. An ink jet recording method using the ink jet recording apparatus according to claim 1, the method comprising the steps of:

feeding a recording medium onto the platen, and
ejecting the ink onto the recording medium.

TABLE 3

|  | Examples | | | | | | Comparative examples | | | | | | |
| --- | --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 | 7 |
| Ink | Ink 1 | Ink 5 | Ink 3 | Ink 5 | Ink 6 | Ink 7 | Ink 1 | Ink 1 | Ink 2 | Ink 3 | Ink 4 | Ink 8 | Ink 8 |
| Type of resin constituting platen | Conductive PP | Conductive PP | Conductive ABS | Conductive ABS | Conductive ABS | Conductive ABS | Conductive ABS | ABS | Conductive ABS | ABS | Conductive ABS | Conductive ABS | ABS |
| Conductivity [Ω·cm] | $10^7$ | $10^7$ | $10^{12}$ | $10^{12}$ | $10^{12}$ | $10^{12}$ | $10^{12}$ | $10^{14}$ | $10^{12}$ | $10^{14}$ | $10^{12}$ | $10^{12}$ | $10^{14}$ |
| Resin SP B $[(J/cm^3)^{1/2}]$ | 16.0 | 16.0 | 22.0 | 22.0 | 22.0 | 22.0 | 22.0 | 22.0 | 22.0 | 22.0 | 22.0 | 22.0 | 22.0 |
| $|A - B|$ $[(J/cm^3)^{1/2}]$ | 7.5 | 8.3 | 3.1 | 2.3 | 2.3 | 2.3 | 1.5 | 1.5 | 0.6 | 3.1 | 1.9 | 2.3 | 2.3 |
| Mist Adhesion | Good | Good | Good | Good | Good | Good | Good | Poor | Good | Poor | Good | Good | Poor |
| Attacking properties | Good | Good | Good | Good | Good | Good | Poor | Poor | Poor | Good | Poor | Good | Good |
| Curl | Good | Good | Good | Good | Good | Good | Good | Good | Good | Good | Good | Poor | Poor |

As is clear in Table 3, Examples of the invention provided high-quality printed sheets that are less likely to curl. In addition, the amount of mist was reduced and the attacking properties of the ink against platen were low. In contrast, no satisfactory results were obtained in Comparative examples.

What is claimed is:

1. An ink jet recording apparatus comprising:
a printer head that ejects ink; and
a platen formed of a conductive resin, the conductive resin being a resin having a conductive substance added thereto,
wherein the ink includes an organic solvent, a surfactant, and 60% by mass or less of water, 8. An ink jet recording method using the ink jet recording apparatus according to claim 2, the method comprising the steps of:

feeding a recording medium onto the platen, and ejecting the ink onto the recording medium.

9. An ink jet recording method using the ink jet recording apparatus according to claim 3, the method comprising the steps of:

feeding a recording medium onto the platen, and ejecting the ink onto the recording medium.

10. An ink jet recording method using the ink jet recording apparatus according to claim 4, the method comprising the steps of:

feeding a recording medium onto the platen, and ejecting the ink onto the recording medium.

11. An ink jet recording method using the ink jet recording apparatus according to claim 5, the method comprising the steps of:
  feeding a recording medium onto the platen, and
  ejecting the ink onto the recording medium.

12. An ink jet recording method using the ink jet recording apparatus according to claim 6, the method comprising the steps of:
  feeding a recording medium onto the platen, and
  ejecting the ink onto the recording medium.

* * * * *